United States Patent [19]

Dallaire

[11] Patent Number: 4,855,915
[45] Date of Patent: Aug. 8, 1989

[54] AUTOGUIDED VEHICLE USING REFLECTIVE MATERIALS

[76] Inventor: Rodney J. Dallaire, 37497 Bristol Ct., Livonia, Mich. 48154

[21] Appl. No.: 25,722

[22] Filed: Mar. 13, 1987

[51] Int. Cl.[4] .............................................. G06F 15/50
[52] U.S. Cl. ................................. 364/424.02; 180/169
[58] Field of Search ........................... 364/424.02, 443; 180/168, 169; 356/1, 4, 375

[56] References Cited

U.S. PATENT DOCUMENTS 4,729,660  3/1988  Tsumura et al. ................. 364/424 X Primary Examiner—David Mis
Attorney, Agent, or Firm—Charles W. Chandler

[57] ABSTRACT

An automatic guiding system for an unmanned goods transportation vehicle is provided by a one dimensional optical detector responsive to specialized targets mounted along a side of the vehicle's path of motion. The specialized targets consist of combinations of retro-refelctive and mirror-like devices in patterns allowing the vehicle to determine both the relative position and heading angle in a single set of measurements.

5 Claims, 7 Drawing Sheets

AUTOGUIDED VEHICLE USING REFLECTIVE MATERIALS

BACKGROUND OF THE INVENTION

This invention concerns a method for self guidance of unmanned vehicles along pre-defined paths using an on-board one dimensional optical sensor and light reflective targets placed at intervals along and to one side of its path.

Autonomously guided (autoguided) vehicles are in common use in factories and warehouses. Some are guided by wires buried in the floor but this type of installation has the disadvantages of a relatively high installation cost, limited flexiblity of path changes, and unsuitablility on soft floor or those with metal reinforcement rods. For these reasons, several different types of alternative guidance schemes have been invented.

One type uses optical paths painted on the floor. However optical paths tend to wear away or can be obscured by dirt. Other types use overhead light beams either emitted from the vehicle to stationary reflectors, or light beams from stationary locations to passive receivers on the vehicle. These systems must reject ambient lighting and also must be mounted high off the ground to insure that the beams are not interruped by traffic and equipment. This height can interfere with loading the vehicle. The presence of the flashing or spinning light beams can also interefere with the visual systems of pedestrians and workesr in the area.

Still other types use optical sensors to detect targets placed at known locations in the building. Guidance is achieved by triangulation. Best accuracy is achieved by using targets that are widely separated in angle. However these types have the disadvantage of requiring two dimensional sensors and a need to see over obstructions.

SUMMARY OF THE INVENTION

Targets are placed at the side of the vehicle's path at known locations. The targets are constructed of inexpensive reflecting and non-reflecting materials. Although they can be mounted at any height along the sides of the pathways, a desirable height is anyhwere between the floor and the height of the vehicle. There can be materials or pedestrians anywhere along the sides of the path so long as they do not block the perpendicular sighting of the target when the vehicle passes by.

When each target is passed, a horizontal optical emitter/scanner measures the angle to various reflectors contained in the target. These angular measurements permit the determination of the distance from the target as well as the heading angle of the vehicle. For cost reasons it is desirable to space the targets as far apart as possible along the paths. This however places stricter guidance requirements on the guidance system, particularly the heading angle. It is the unique arrangement of the reflectors on the target that allow heading angles to be accurately measured.

Two or more reflective stripes are mounted on a non-reflecting background. At least one reflector has a mirror-like reflection that can only be seen when the viewer is directly perpendicular to its surface. In addition there must be at least one other reflective stripe, either mirror-like or retro-reflective. A retro-reflecttive target reflects light directly hack to its source independent of the illumination direction as long as the angle of incidence is within an angle of approximately 20 degrees of the surface normal. An exmaple of a retro-reflector is a bicycle reflector. One source is K-mart stock no. STG-111K.

Upon viewing one target and measuring the angles to the reflectors within the target, a vehicle can assess both its position and angle using triangulation.

Mirrors are a critical element in this invention because they provide a direct measurement of the heading angle of the vehicle. Since the orientation of the mirror-like reflector is known to the guidance system, observed reflection indicate an absolute reference angle. Other optical reflectors provide only the relative angle between the vehicle's heading and the target.

Another advantage of mirror reflectors is that false reflections can be rejected because only mirror-like reflections have a return that comes and goes quickly as the vehicle passes the target.

Angle determination is important for two reasons. First, when the vehicle starts up, it must quickly correct its heading to avoid going out of its path. If the angle is known, a steering correction can be initiated immediately as opposed to a system which must sense a change in range to the wall before a determination of its out-of-path motion can be made. A second reason is that large errors in heading angle are realized with small errors in distance measurements if the bearing angle must be determined from successive distance measurements. This method includes systems that measure range to the wall with sonar or other distance-measuring equipment. This invention's target provides heading angle accuracies limited only by the error in measuring the angle to the target.

The vehicle is trained to locate the targets by driving the vehicle through all of the desired paths and intersections. Control is effected via a control box attached by a cable to the vehicle. A computer, either on-board, or remotely via a radio signal, remembers the locations and the desired distances from the targets. The along-track distances are measured by encoders on the vehicle's wheels. The computer is also aware of the steering commands so that turns and jogs can be replicated. The user need not drive the vehicle down all possible combinations of paths during the training period. The computer links up all intersections to form a map of the sum of all targeted paths.

In operation, the users load or unload the vehicle then issue commands to go to any desired location by push buttons on-board the vehicle or by computer cards inserted in a slot. When the "go" button is pushed, the vehicle waits for two seconds to allow the user to get clear of the vehicle and to check for obstacles in its path. Obstacle determination is performed via sonar beams looking directly ahead, or as a last resort, bumpers with switches to stop the vehicle. Whenever the path is clear, the vehicle moves to its computed destination via the most direct route. If a target is not observed at its expected location, the vehicle stops and reverses a short distance to try again. If it fails a second time it stops and signals for help.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
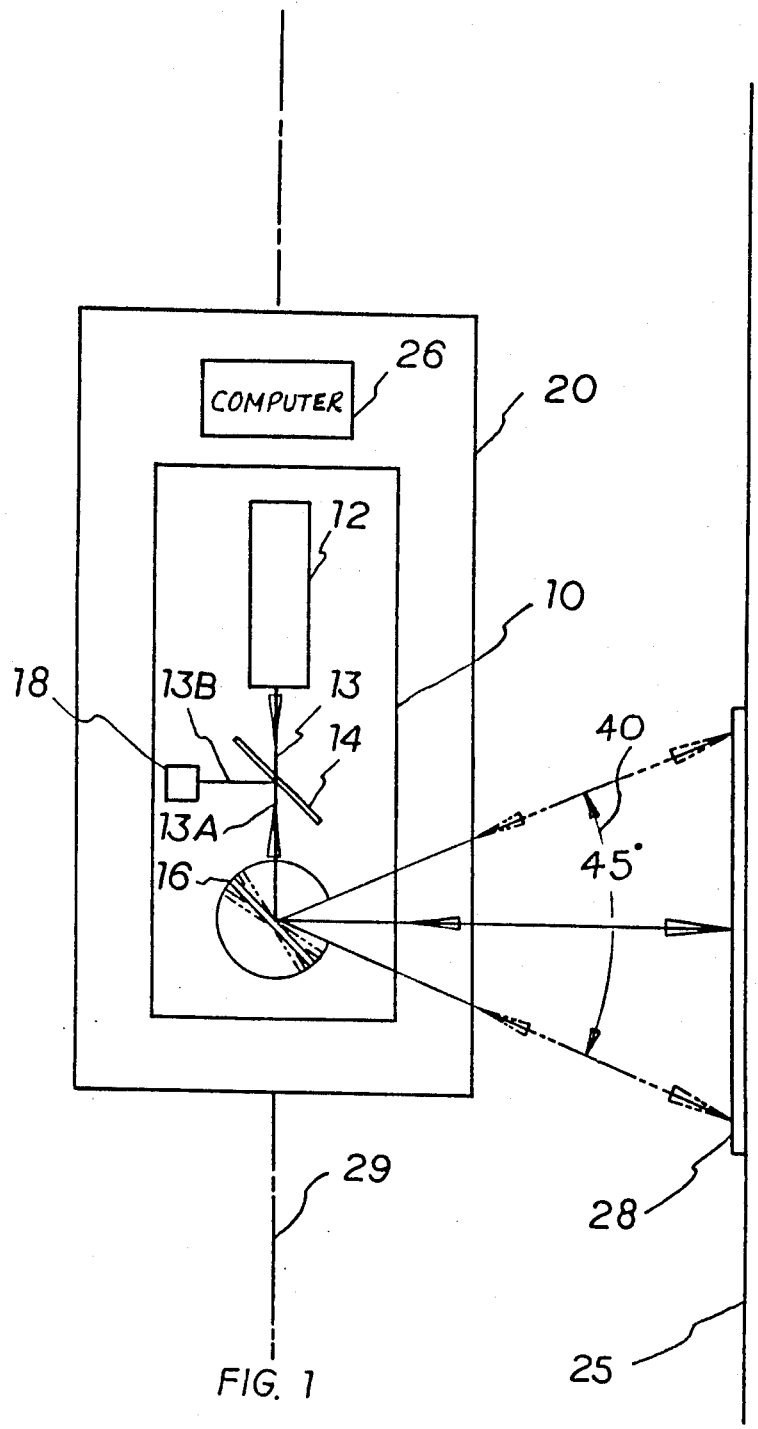
FIG. 1 is a plan view of an optical sensor mounted on a vehicle, and a representative target, to illustrate one preferred embodiment of the invention.

FIG. 1 illustrates a collimated light source 12, a beam splitting mirror 14, a spinning mirror 16, and an optical receiver 18, all mounted on vehicle 20. Collimated light source 12 transmits a beam of light 13 toward mirror 14. Beam splitting mirror 14 transmits approximately 50 percent of the light beam to spinning mirror 16 causing the beam to scan a 45 degree pattern 40 before it repeats with the turn of the mirror.

Vehicle 20 supports sensor 10 and has a nominal path of motion 29.

The rotational rate of mirror 16 must be sufficient to effect a light scan of target 28 before the vehicle moves an appreciable distance. The light from the reflecting elements of target 28 returns through spinning mirror 16 and beam splitting mirror 14 to receiver 18 where it is detected and sent to computer 26. The computer associates the angular position of spinning mirror 16 with each reflected return and cmputes the locations of the reflectors.

The method of determining the angular position of spinning mirror 16 can be any method including shaft encoders.

The optical path of light beam 13 is located approximatley half way between the two sides of vehicle 20 so that, depending on the angel of mirror 16, targets to the left and to the right of the vehicle can be sensed with equal ease.

The use of beam splitting mirror 14 is not essential but is highly desirable because most of the reflected light from a retro-reflector returns along the same path as the outgoing light. Beam splitting mirror 14 reflects the light to a receiver. This method of gathering the reflected light is used because it is essentially co-located with the outgoing light beam.

Figure 2:
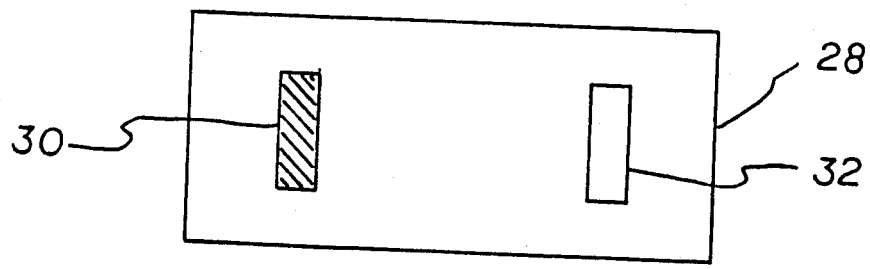
FIG. 2 is an elevational view of the target, showing one retro-reflector and one mirror reflector.
Figure 3:
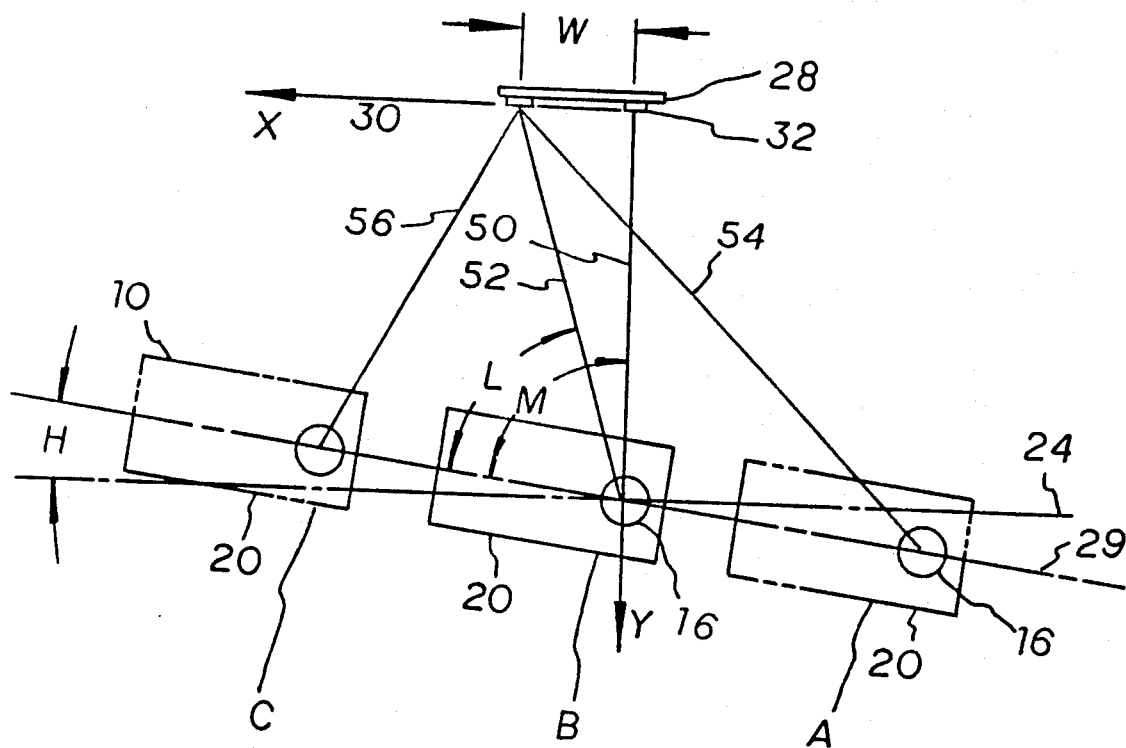
FIG. 3 is a plan view of the target of FIG. 2, and illustrates how the angles to the two reflectors can be simultaneously measured by the vehicle only when it is perpendicular to the mirror reflector.

FIG. 2 shows the simplest type of target that affords an accurate position and angle measurement in one scan of the target. Target 28 has one retro-reflective stripe 30 and one mirror reflective stripe 32. FIG. 2 illustrates the plan view of the target, and three sequential positions of the vehicle while passing the target: A, B, and C. The desired path 24 of the vehicle is parallel to the reflecting surface of mirror stripe 32. Heading angle error H is the angle between path 24 and the actual path 29 of the vehicle.

The light beam is scanned across the target when the vehicle is in the vicinity of the target. When the vehicle is at position B, where spinning mirror 16 is along a line perpendicular to mirror stripes 32, a light beam returned from mirror stripe 32 is detected by observing the presence of the return near broadside which lasts for only the period of time that spinning mirror 16 is perpendicular to mirror stripe 32. At this time, a return from retro-reflector 30 can also be detected as a result of its ability to reflect light directly back to its source.

When the vhicle is in position B, both angle L (which is measured between path 29 and a line 52 from mirror 16 to retro-reflective stripe 30) and angle M (which is measured between path 29 and a line 50 from mirror 16 to mirror stripe 32) are measured by noting the angular orientation of spinning mirror 16 at the time the return beams are detected. The spatial position of the spinning mirror 16 relative to mirror stripe 32 can be calculated by the following equations:

$$X = 0$$
$$Y = W/\tan(M - L)$$

where W is the distance between mirror 32 and retro-reflector 30. The origin of the X-Y coordinate system is at the center of mirror stripe 32. X is the distance along and parallel to desired path 24, and Y is the distance between and perpendicular to mirror stripe 32 and spinning mirror 16. Heading H is directly computed by substracting 90 degrees from angle M.

Target 28 can be generalized to contain more mirror stripe reflectors and more retro-reflectors to increase the measurement accuracy by averaging the measurements.

Figure 4:
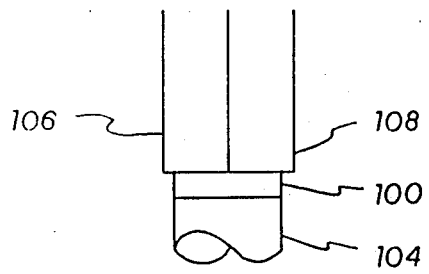
FIG. 4 is an elevational view of a second embodiment of the target and employs two mirror reflectors.
Figure 5:
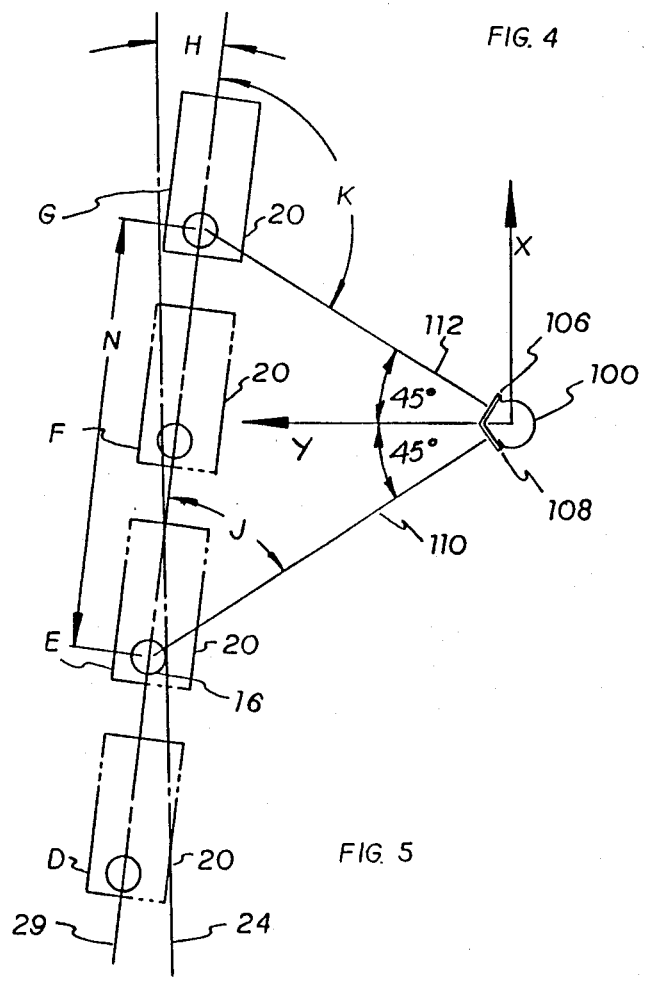
FIG. 5 is a plan view of the target in FIG. 4 illustrating the angle at which each mirror reflector can be detected.

Another type of target 100 is shown in FIG. 4 and can be used when it is important to have a narrow target such as when mounted on a post 104. Target 100 has two mirrors 106 and 108 each oriented 45 degrees off of the Y axis. With reference to FIG. 5, positions D, E, F and G represent the successive positions of vehicle 20 in a time sequential manner as the vehicle passes target 100. The distance (N) traveled by the vehicle 20 between two observed reflections from target mirrors 106 and 108, along with the measured angles J and K to the same provide the vehicle's position and heading via the following equations:

$$H = 180 - J - K$$
$$X = 0$$
$$Y = N \tan((180 - J + K)/2)$$

where the computed X and Y position is for the point in time when the vehicle was half way betwen E and G. J is the angle between heading path 29 and light beam return line 110 from mirror 16 to mirror 108 when vehicle 20 is in position E; K is the angle between heading path 29 and light beam return line 112 from mirror 16 to mirror 106 when the vehicle 20 is in position G. Only when the vehicle is located at either position E or G can returns from mirrors 106 and 108 be detected.

Target 100 can also be generalized to contain more than two angled mirrors to enable more measurements and therefore reduce any measurement errors.

Figure 6:
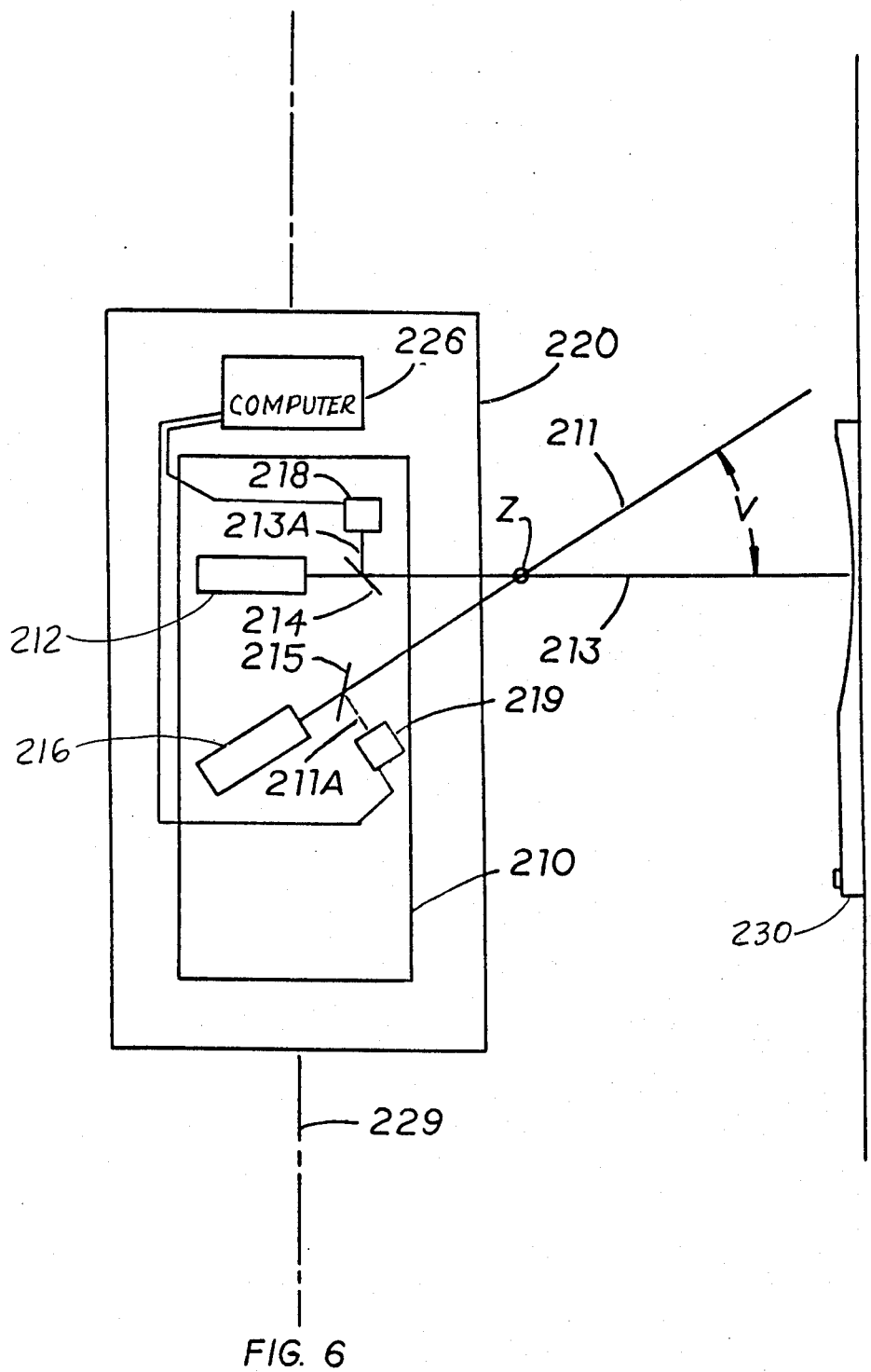
FIG. 6 is a plan view of a second preferred embodiment of a vehicle and a representative target.

Vehicle 220 is shown in FIG. 6. This embodiment eliminates the spinning mirror by allowing specific angles to be measured to reflections via the use of two (or more) beams of light. Light source 212 is mounted on the vehicle to direct a beam of light 213 perpendicular to the actual vehicle path 229. Coupled with light source 212 is a beam-splitting mirror 214 and receiver 218 operating in an identical manner to that described in FIG. 1. Light source 216 directs a beam of light at a known an angle of V degrees with respect to light beam 213, and is coupled to its own beam-splitting mirror 215 and receiver 219. The location where the two beams cross is noted as Z. All of the optical equipment is termed sensor 210 and is supported by vehicle 220.

Both receivers are connected to computer 226 which senses when a reflection is received by either receiver, and associates the distance traveled by the vehicle between the receptions.

Figure 7:
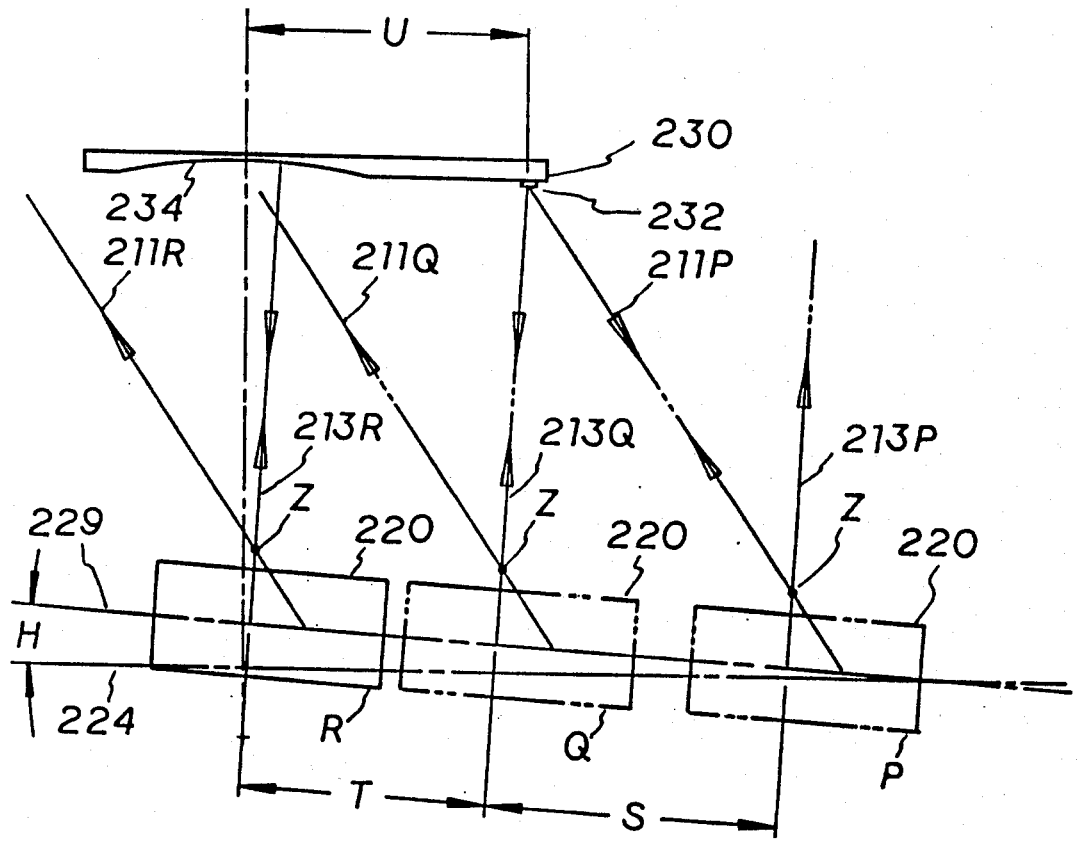
FIG. 7 is a plan view of another type of target being detected at three positions by the vehicle in FIG. 6.

FIG. 7 illustrates the sequence where the receptions are found from specialized target 230. Target 230 contains a retro-reflector 232 and a curved mirror 234. The curved mirror is circular in cross secdtion with the portion that is parallel to the intended path 224 located at a distance U from the retro-reflector. When the vhicle is at position P, the forward angled light beam 211P is reflected from retro-refelctor 232 and detected by receiver 219. When the vehicle is at position Q, the perpendicular light beam 213-Q is reflected from retroreflector 232 and detected by receiver 218. The computer stores the distance S traveled between the two detections. WHen the vehicle is at positoin R, the perpendicular light beam 213-R is reflected from the portion of curved mirror 234 that is parallel to the direction of travel and is detected by the receiver. The computer also stores the distance T traveled between positions Q and R. With knowledge of the distances S and T, and the angle V, the heading angle H and the location of point Z can be found by the following equations:

$$H = \sin^{-1}(T/r) - \sin^{-1}(U/r)$$

$$\text{Range} = S/\tan(V)$$

where r is the radius of the curved mirror and Range is the distance from retro-reflector 232 to point Z when the vehicle is at position Q.

The computer 26, in all cases, is used to perform the required computations to determine the position and heading angle error H. It then computes a change in the future course of the vehicle to correct the vehicle path and to achieve the desired distance and heading angle before the process is then repeated at the next target. The computer also sotres the locations and types of targets placed along the desired paths in an electronic memory. From this knowledge it can look for the targets' reflections at the proper locations.

Figure 8:
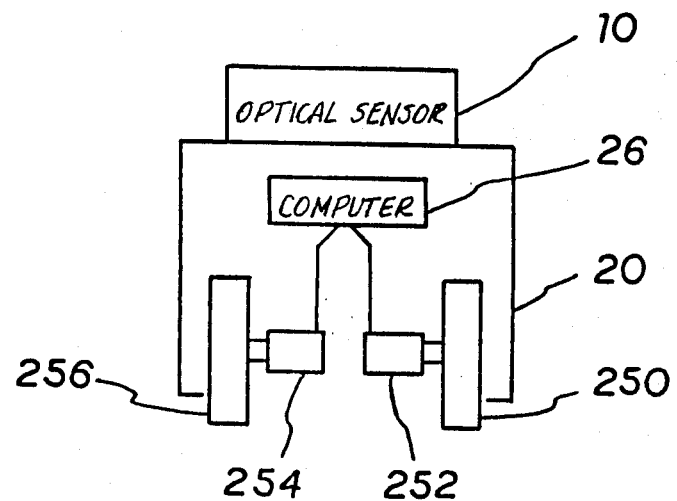
FIG. 8 is a rear view of the vehicle illustrating the drive and steering mechanism.

Referring to FIG. 8, the computer 26 issues motion and steering command to electric motors 252 and 254 on drive wheels 250 and 256 to effect steering and propulsion so as to navigate the vehicle 20 from target to target and around corners. The vehicle knows its intermediate positions and headings by integration of the rotation of the drive wheels and the heading angles. The locations and types of the targets are input to the computer by driving the vehicle past them in a training session.

Figure 9:
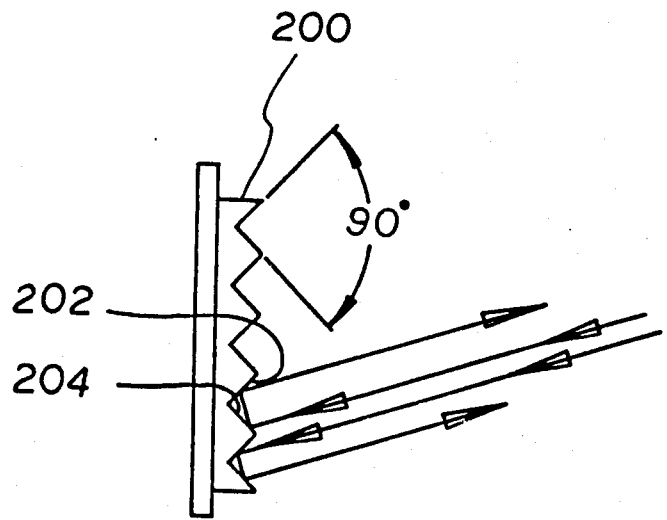
FIG. 9 is a side view of a dihedral mirror reflector illustrating the reflection of a light ray from a source above the reflector.

In cases where the vehicle must traverse rough pathways, the rocking (tilting) of the vehicle can slant the light beam upward or downward and cause the reflections from the mirror reflector to miss the receiver. In these cases the mirror reflectors can be generalized to dihedral mirrors as shgown in FIG. 9. A dihedral reflector 200 uses reflecting surfaces such as at 202 and 204 which are at right angles to each other. When the surfaces are small, many of them can be put on a single reflector. When the intersections of the surfaces are horizontal, light entering upward or downward will be reflected in a plane containing the line of intersection of the reflecting surfaces and the source of light. When the vehicle is parallel to the line of intersection, it will be able to observe its reflection as long as a portion of the reflecting strip is illuminated by the light source.

Having described my invention, I claim:

1. A guidance means for a vehicle traveling along a path comprising:

a target mounted along and to the side of a vehicle path, said target having at least a mirror reflective element and one or more horizontally arranged retro-reflective elements;

first means mounted on the vehicle for emitting a beam of light toward the target and for sensing a reflection of the light beam from the mirror-reflective element and the retroreflective element at such times as the vehicle is at a pre-set distance from the target; and computer means on the vehicle for computing the position and heading of the vehicle according to a signal received from the first means in response to sensing the reflected light beam at such times as the beam of light is along a line perpendicular to the reflective surface of the mirror reflective element, and the beam of light is within a predetermined angle of incidence of the reflective surface of the retro-reflective element.

2. A guidance system as defined in claim 1, in which the target comprises at least one retro-reflector and one curved mirror disposed such that measurements of the distance travelled between the reflections can be used to triangulate the vehicle's position and heading.

3. A guidance means as claimed in claim 2 wherein the reflective elements are accodion pleated with narrow horizontal mirror stripes at 90 degree angles to constrain the reflections to a plane defined by the line of intersection of the horizontal mirror stripes and the transmitted light beam.

4. A vehicle guidance system for a moving vehicle having steering means, comprising:

a plurality of spaced targets mounted along a predetermined path of vehicle motion;

a reflective mirror, and a retro-reflective element mounted on each target;

means on the vehicle for emitting a light beam toward the reflective mirror and the retro-reflective element of each target as the vehicle is passing the target, and for sensing a reflection of the light beams from the mirror on each target at such times as the beam of light is along a line generally perpendicular to the reflective surface of the mirror, and for sensing a reflection from the retro-reflective element at such times as the beam of light is within a predetermined angle of incidence of the reflective surface of the retro-reflective element;

steering means mounted on the vehicle for changing the direction of motion thereof; and computer means on the vehicle for computing the vehicles actual path of motion according to a signal received from the light-sensing means in response to receiving the reflected light beams from the reflective mirror and the retro-reflective element, and for transmitting a corrective steering command to the steering means depending upon the difference between the actual path of vehicle motion and the predetermined path of vehicle motion.

5. A method for guiding a vehicle along a predetermined path of motion, the vehicle having steering means, comprising the steps of:

locating a plurality of spaced targets along the predetermined path of motion, each target having a reflective mirror, and a retro-reflective element;

emitting a light beam from the vehicle toward each target as the vehicle is passing the target, and sensing the reflection of the light beam from the mirror on each target at such times as the beam of light is along a line perpendicular to the reflective surface of the mirror, and sensing a reflection of the light beam from the retro-reflective element at such times as the beam of light is within a predetermined angle of incidence of the retro-reflective element; and computing the vehicle's actual path of motion according to a signal received from the light sensing means in response to receiving the reflective light beams from the reflective mirror and retro-reflective element, and transmitting a corrective steering command to the steering means depending upon the difference between the actual path of vehicle motion and the predetermined path of vehicle motion.

* * * * *